(12) United States Patent
Hornung et al.

(10) Patent No.: US 9,175,793 B2
(45) Date of Patent: Nov. 3, 2015

(54) ATTACHMENT CONNECTION, AND METHOD OF CONNECTING A THIN-WALLED HOSE LINE TO A CARBON-CONTAINING ATTACHMENT PART

(75) Inventors: Jorg Hornung, Olbronn-Durrn (DE); Gerald Kolbe, Pforzheim (DE); Michael Rumold, Neulingen-Bauschlott (DE); Massimo Messina, Eggenstein (DE)

(73) Assignee: WITZENMANN GMBH, Pforzheim (DE)

( * ) Notice: Subject to any disclaimer, the term of this patent is extended or adjusted under 35 U.S.C. 154(b) by 1200 days.

(21) Appl. No.: 12/740,860

(22) PCT Filed: Oct. 15, 2008

(86) PCT No.: PCT/EP2008/008691
§ 371 (c)(1),
(2), (4) Date: Apr. 30, 2010

(87) PCT Pub. No.: WO2009/056220
PCT Pub. Date: May 7, 2009

(65) Prior Publication Data
US 2010/0237609 A1    Sep. 23, 2010

(30) Foreign Application Priority Data
Oct. 30, 2007   (DE) .................. 10 2007 051 765

(51) Int. Cl.
*F16L 13/00* (2006.01)
*F16L 13/02* (2006.01)
*F01N 13/18* (2010.01)
*F16L 25/00* (2006.01)
*F16L 33/26* (2006.01)

(52) U.S. Cl.
CPC ......... *F16L 13/0209* (2013.01); *F01N 13/1805* (2013.01); *F01N 13/1861* (2013.01); *F16L 25/0036* (2013.01); *F16L 33/26* (2013.01); *F01N 2450/22* (2013.01); *F01N 2470/12* (2013.01); *F01N 2530/00* (2013.01)

(58) Field of Classification Search
CPC .............. F16L 13/0227; F16L 13/0236; F16L 13/0209
USPC ........ 285/288.1, 288.8, 288.9, 329, 298, 299, 285/226
See application file for complete search history.

(56) References Cited

U.S. PATENT DOCUMENTS

| 2,365,181 | A | * | 12/1944 | Fentress | 285/226 |
| 2,832,613 | A | * | 4/1958 | Farrar et al. | 285/226 |
| 3,248,134 | A | * | 4/1966 | Pennington | 285/288.9 |
| 4,209,177 | A | * | 6/1980 | Hall | 277/608 |

(Continued)

FOREIGN PATENT DOCUMENTS

| DE | 20310239 | * | 9/2003 |
| EP | 0790455 | * | 8/1997 |
| EP | FR 2759141 | * | 8/1998 |

(Continued)

*Primary Examiner* — Gregory Binda
*Assistant Examiner* — James Linford
(74) *Attorney, Agent, or Firm* — Volpe and Koenig, P.C.

(57) ABSTRACT

An attachment connection is provided including a thin-walled hose line connected with a carbon-containing attachment part of a carbon-containing iron alloy with a carbon component C >0.5% and a weld connection is provided between the hose line and the attachment part.

8 Claims, 3 Drawing Sheets

(56) References Cited

U.S. PATENT DOCUMENTS

Figure 1:
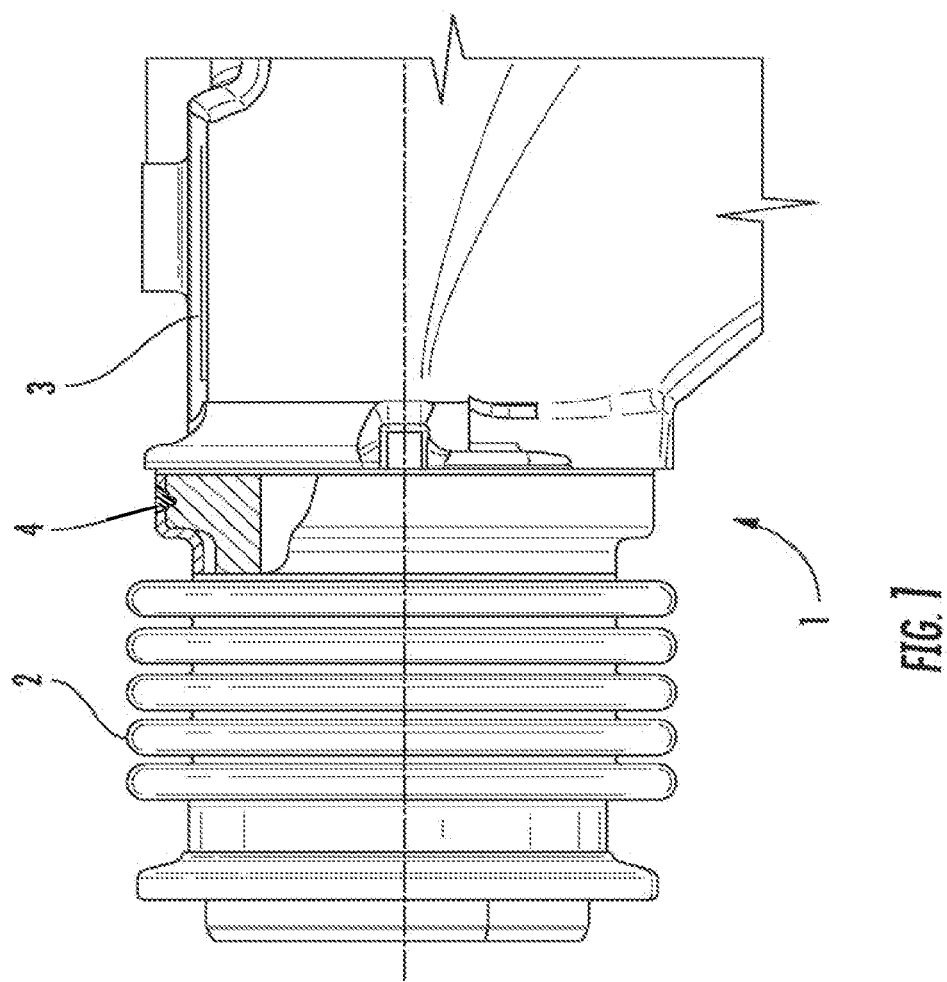

| | | | | |
|---|---|---|---|---|
| 4,270,348 A | * | 6/1981 | Winberg | 60/323 |
| 4,778,203 A | * | 10/1988 | Bartholomew | 285/111 |
| 5,331,810 A | * | 7/1994 | Ingermann et al. | 60/322 |
| 5,689,954 A | * | 11/1997 | Blocker et al. | 60/322 |
| 5,784,881 A | * | 7/1998 | Otsuka et al. | 60/322 |

FOREIGN PATENT DOCUMENTS

| | | |
|---|---|---|
| GB | 591635 | 8/1947 |
| WO | 2005026600 | 3/2005 |

* cited by examiner

ATTACHMENT CONNECTION, AND METHOD OF CONNECTING A THIN-WALLED HOSE LINE TO A CARBON-CONTAINING ATTACHMENT PART

BACKGROUND

The present invention relates to an attachment connection for thin-walled hose lines with a carbon-containing attachment part of a carbon-containing iron alloy with a carbon component C>0.5%, in particular, made from cast iron.

Furthermore, the present invention relates to a method for connecting a thin-walled hose line to a carbon-containing attachment part, of a carbon-containing iron alloy with a carbon component C>0.5%, in particular, made from cast iron.

In particular, in the case of exhaust-gas systems for motor vehicles with internal combustion engines, it is known to screw hose line parts of the exhaust gas system, in particular, in the form of metal bellows, through the use of V-clamps onto attachment parts of the exhaust-gas system made from carbon-containing materials, such as cast iron or the like. Alternatively, plug-in connections or FEY-ring connections can be used in this region. The known attachment parts can involve, in particular, exhaust manifolds.

Such known solutions have clear disadvantages especially with respect to ever higher sealing requirements (up to pressures of 10 bar), such that leaks are often produced in the region of the attachment connection.

In addition, the known attachment connections require a relatively large installation space in the axial direction, which has a disadvantageous effect on the flexibility to be achieved in the hose line to be used. In particular, if this is formed as a bellows, then the installation space required for the attachment connection limits the number of possible bellows corrugations at the top. Associated with this are relatively high wear and a correspondingly short service life of the known attachment connections.

From WO 2005/026600 A1, a metal tube and a method for its production are known, in which a metal shaft tube together with a surrounding braid are material connected via radial welding with a connection part, wherein the connection part as well as the shaft tube and the metal braiding are produced in stainless steel.

SUMMARY

The invention is based on the objective of providing an attachment connection of the type noted above, as well as a connection method of the type noted above, which distinguish themselves through increased tightness and reduced installation space. In addition, the wear should be reduced and the service life should be increased accordingly.

The invention meets this objective through an attachment connection and method as provided.

According to the invention, an attachment connection for thin-walled hose lines with a carbon-containing attachment part of a carbon-containing iron alloy with a carbon component C>0.5%, in particular, made from cast iron, is characterized in that the hose line is fixed by welding to the attachment part.

Furthermore, a method according to the invention for connecting a thin-walled hose line with a carbon-containing attachment part of a carbon-containing iron alloy with a carbon component C>0.5%, in particular, made from cast iron, is characterized in that the hose line is fixed by welding, in particular, laser or electron-beam welding, to the attachment part with a material-bonded connection.

According to one aspect of the present invention, the attachment of the thin-walled hose line to the relatively stronger carbon-containing attachment part is realized by a weld connection, in order to produce an especially gas-tight connection. In this way, the present invention overcomes a very common prejudice according to which the welding of a relatively stronger carbon-containing iron alloy with a carbon component C>0.5%, in particular cast iron, with a thin-walled hose line is considered unsuitable for economical viewpoints due to embrittlement in the melting range. Instead, by overcoming the mentioned prejudice, the present invention produces a significantly reduced installation space in the axial direction for the created attachment connection, which is also distinguished by its economical manufacturability.

Here, in the scope of the present description, the term "thin-walled hose line" means that a wall thickness of the hose line in the weld region equals at most 1.5 mm.

In order to counteract hardening and embrittlement of the material in the weld region, a preferred refinement of the attachment connection according to the invention provides that the weld part, that is, the hose line, has a relatively high nickel content. In the case of refinements of the invention, this lies in the range of at least 10%, advantageously at 25% to 30% and at most advantageously at 72% to 75%.

As the welding method for binding the hose line to the attachment part—as already mentioned—in particular, laser or electron beam welding methods can be used. In particular, in the case of constructions of the invention in which, consequently, the hose line material has only a relatively low nickel content, nickel-containing additives can be used in the weld region, for example, in the form of a ring arranged between the hose line and attachment part or in the form of films, wires, or powder, advantageously from a material with the relatively high nickel content described above, optionally from the same material as the hose line. The mentioned ring advantageously has a thickness from 0.1 to 1.0 mm, at most advantageously 0.3 to 0.5 mm.

The martensite formation that regularly occurs when welding carbon-containing material and that leads to undesired material embrittlement can be reduced in a refinement of the present invention by a suitable selection of the process parameters for the welding. Thus, for example, it can be provided that energy is introduced into the weld region such that a bond cross section of the weld connection between the hose line and attachment part equals at least 50%, advantageously 70% to 80%, or even past 100% of the wall thickness of the hose line in the weld region. In other words: in the scope of the named constructions of the present invention, it is provided that the weld seam has a relatively wide and flat construction, so that a relatively large ratio of bond cross section to wall thickness of the hose line is produced in the weld region. In addition to the relatively large bond cross section, this has the result that a relatively large amount of nickel-containing material of the hose line is fused and only a relatively small amount of carbon-containing material of the attachment part, wherein the already mentioned embrittlement can be reduced by the martensite formation.

Alternatively, the weld seam can also be generated in the course of deep welding at a corresponding pulse intensity, wherein, however, only a relatively small amount of nickel-containing material of the hose line is fused in a rather disadvantageous way and due to the relatively small bond cross section in the contact region different than for the previously explained variant, only a relatively small amount of material mixture is realized.

In particular, in order to obtain the required small gap width of a maximum 50 μm in the joint region, in the course of a refinement of the method according to the invention it can be provided that the parts to be welded are riveted before the welding. The regions to be connected should be cleaned in each case.

As already mentioned, the regions to be connected of the hose line of the attachment part must be essentially gap-free. For this purpose, a different refinement of the attachment connection according to the invention is provided such that, in this region, a self-locking pressing of the parts to be connected is achieved such that the hose line and/or the attachment part in an overlapping region of these two components has a joint surface that is inclined relative to the joint surface of the other component, so that the joint surfaces are not parallel to each other.

The solution according to the invention or their respective refinements ensure that the number of interfaces in the overall system of an exhaust-gas system is reduced, which leads to a reduction of leakage losses accordingly.

Due to the fact that the installation space available for the hose line is increased in the case of an unchanged overall installation space, the service life of the hose line can be optimized.

Through the reduction achieved according to the invention in the number of individual parts to be used for the attachment connection, it also results in a reduction with regards to production costs and assembly complexity.

DETAILED DESCRIPTION OF THE DRAWINGS

Figure 2:
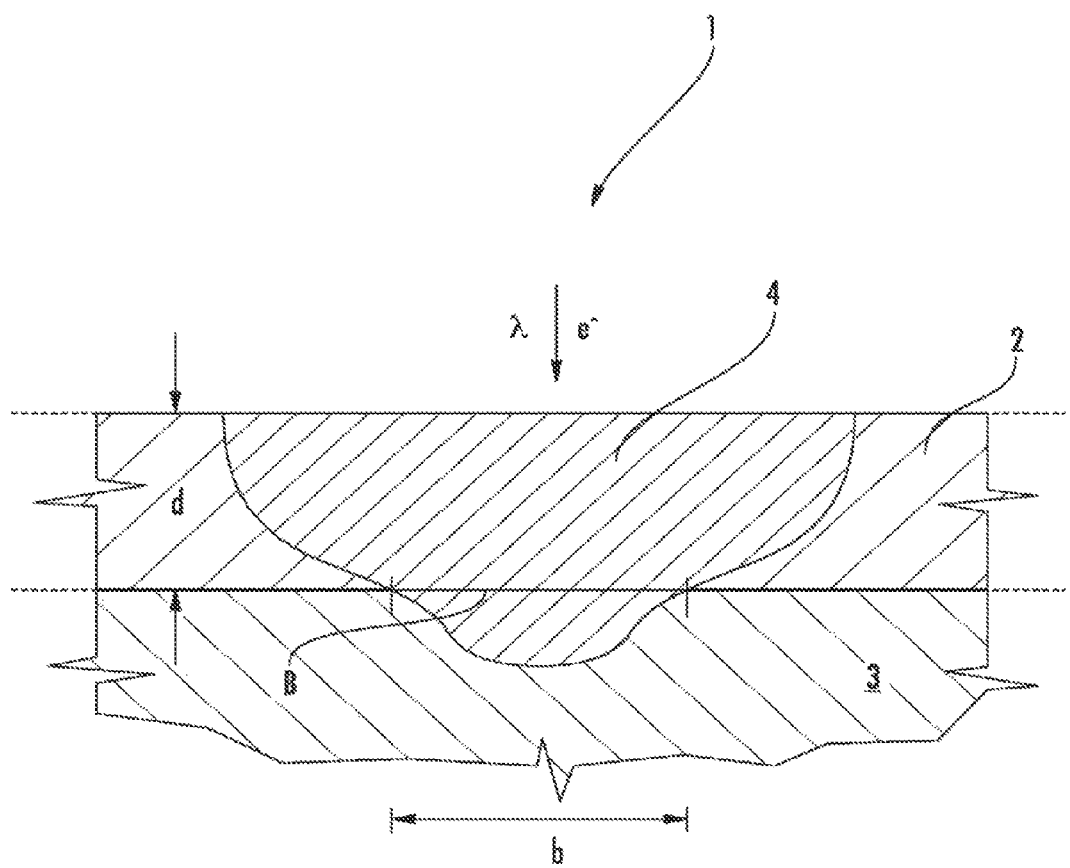
Figure 3:
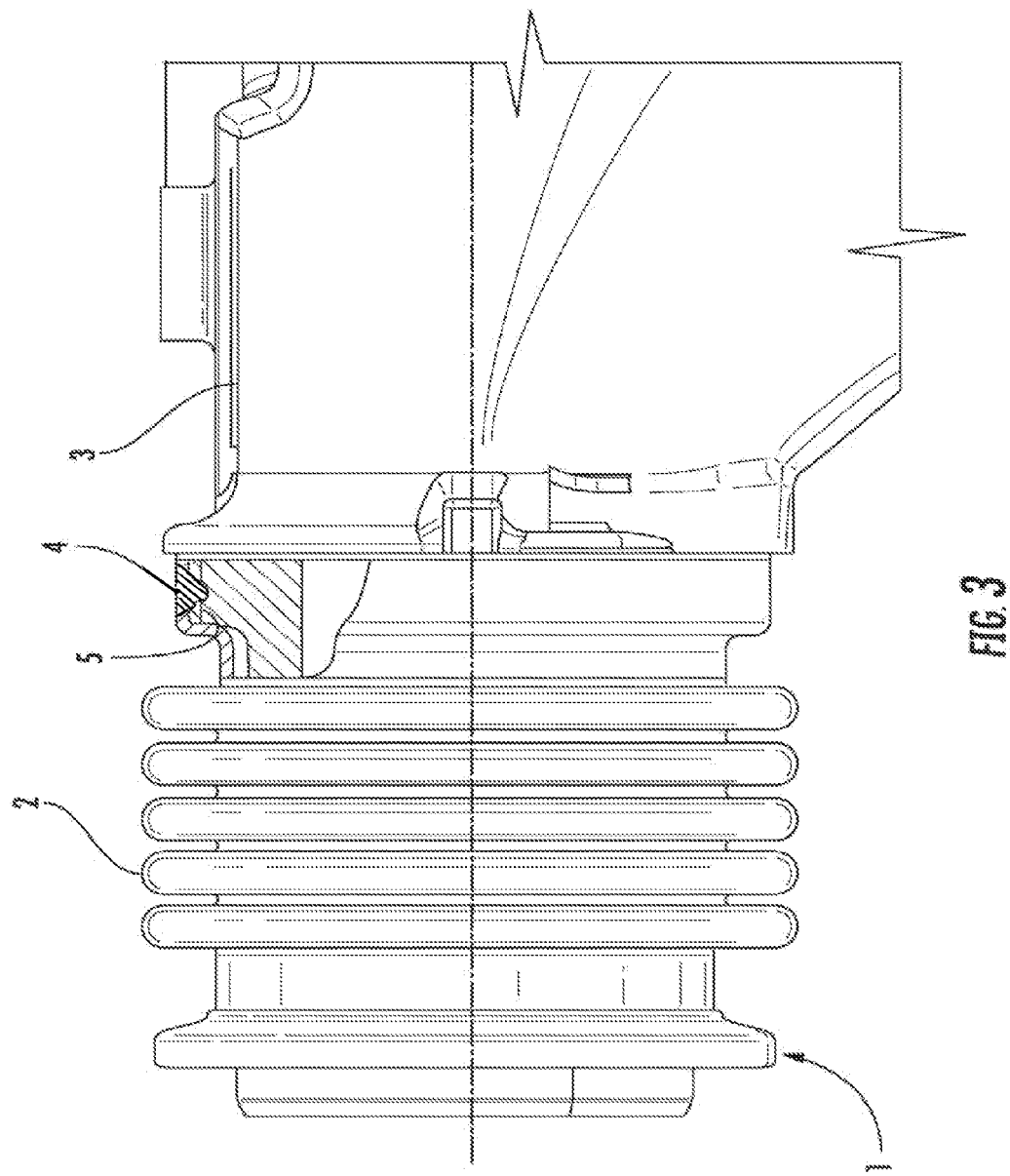

Additional properties and advantages of the present invention are given from the following description of embodiments with reference to the drawing. Shown are:

FIG. 1 a construction of the attachment connection according to the invention, shown in a longitudinal view, partially in cross-section, FIG. 2 a detail enlargement of the weld seam in FIG. 1, and FIG. 3 another construction of the attachment connection according to the invention, in a longitudinal view, partially in cross-section.

DETAILED DESCRIPTION OF THE PREFERRED EMBODIMENTS

FIG. 1 shows an attachment connection 1 for a thin-walled hose line 2 in the form of a metallic ring-corrugated hose or bellows with a cast part 3, presently a manifold for the exhaust-gas system of a motor vehicle, which is produced from cast iron and which has a carbon content C>0.5%. The hose line 2 and the cast part 3 are connected to each other or fixed one on the other with a material bond through welding in the region of a peripheral weld seam 4.

As someone skilled in the art can see, the present invention is not limited to the constructions of the hose line 2 and the cast part 3 named presently as examples, but instead can be used anywhere a relatively thin-walled hose line 2 is to be connected to a carbon-containing attachment part 3, in particular, a gas-tight way.

FIG. 2 shows a detailed view of the weld connection 4 according to FIG. 1. Here, the weld connection 4 is shown with cross-hatching in FIG. 2. The same reference symbols designate elements that have the same construction or effect in FIG. 1 and FIG. 2.

As can be taken from FIG. 2, a wall thickness of the hose line 2 in the weld region equals, for example, d≤1.5 mm.

The metallic material of the hose line 2 advantageously has a nickel content of at least 10%, in order to counteract embrittlement in the weld region. After welding, the cast part 3 and the hose line 2 are connected by an (average) cross section b by at bond region B. In order to guarantee a durable weld connection between the hose line 2 and attachment part 3, the ratio b/d in the course of preferred constructions of the present invention equals at least 0.5 and can increase up to values >1. The relatively flat construction of the weld connection 4 shown in FIG. 2, that is, a low penetration of the melt zone into the material of the attachment part 3 contributes to the prevention of material embrittlement, in particular, of the material of the attachment part 3, in the weld region. Such embrittlement is also counteracted by a relatively high nickel content of the hose line material. For this purpose, in the scope of the present invention it can be provided that an additional nickel-containing material, in particular, in a ring, film, wire, or powder form, is introduced into the weld region or especially into the contact region of the hose line and attachment part 3 before the hose line 2 is pushed onto the attachment part 3 in the bond region B, which, however, is not shown explicitly in FIG. 2.

In contrast, FIG. 3 shows an additional construction of the attachment connection according to the invention in which an intermediate ring 5 made from a relatively strong, nickel-containing material is provided between the hose line 2 and attachment part 3, wherein this material can correspond to that of the hose line 2.

In addition, the hose line 2 and the attachment part 3 can be riveted together before the welding, which is likewise not shown explicitly in FIG. 2.

Deviating from the type of weld connection shown in FIG. 2 between the hose line 2 and attachment part 3, the bonding of the hose line 2 of an attachment part 3 can also be realized by deep welding, which, however, possibly results in a reduced bond cross section b associated with amplified melting of the carbon-containing material of the attachment part 3.

Although each joint face of the hose line 2 of the attachment part 3 is shown in parallel in FIG. 2, for the attachment connection 1 it can also be alternatively provided that one of the mentioned joint surfaces (that are not designated explicitly in FIG. 2) is inclined relative to the other joint surface.

For connecting the hose line 2 to the attachment part 3, in the scope of the present invention, advantageously known laser or electron-beam welding methods are used, which is shown schematically in FIG. 2 (reference symbols X and e', respectively).

In this way, an especially gas-tight connection of the hose line 2 to the attachment part 3 can be achieved, wherein, in addition to favorable production costs, this connection distinguishes itself also primarily through its small installation space that allows, for example, for the construction of the hose line 2 as a bellows (cf. FIG. 1 and FIG. 3), an increase in the number of bellows corrugations and thus an increase in the flexibility for the same installation space, which contributes to an increase in the service life of the arrangement.

The invention claimed is:

1. Attachment connection (1) comprising a thin-walled hose line (2) abutting and welded to a cast iron exhaust manifold (3) with a carbon component C >0.5% and a weld connection (4) is provided between the hose line (2) and the exhaust manifold (3) wherein a bond cross section (b) of the weld connection (4) between the hose line (2) and the exhaust manifold (3) equals at least 50% of a wall thickness (d) of the hose line (2) in a weld region and wherein the wall thickness (d) of the hose line (2) equals 1.5 mm or less in a weld region of the weld connection, wherein the hose line is a metallic ring corrugated hose or bellows, and wherein the hose line is formed of a material that has a nickel content of at least 10%.

2. Attachment connection (1) according to claim 1, wherein the bond cross section (b) equals at least 80% of the wall thickness (d) of the hose line (2) in the weld region.

3. Attachment connection (1) according to claim 1, wherein the bond cross section (b) corresponds to at least the wall thickness (d) of the hose line (2) in the weld region.

4. Attachment connection (1) according to claim 1, wherein the weld connection (4) between the hose line (2) and attachment part (3) is produced through laser welding or electron welding.

5. Attachment connection (1) according to claim 1, wherein the weld connection (4) between the hose line (2) and exhaust manifold (3) is produced through welding.

6. Attachment connection (1) according to claim 1, wherein at least one of the hose line (2) or the exhaust manifold (3) has, in an overlapping region of these two components, a joint surface inclined relative to a joint surface of the other corresponding component.

7. Attachment connector (1) according to claim 1, wherein the attachment part is formed of cast iron.

8. Attachment connector (1) according to claim 1, wherein the nickel content is at least 25-30%.

\* \* \* \* \*